United States Patent
Koo et al.

(10) Patent No.: US 8,776,729 B2
(45) Date of Patent: Jul. 15, 2014

(54) PET DENTAL CHEW

(75) Inventors: Bon Gill Koo, Gyeonggi-do (KR); Myung Jin Lee, Gyeonggi-do (KR); Chan Mi Chon, Gyeonggi-do (KR)

(73) Assignee: Forcans Inc., Anseongi-si, Gyeonggi-do (KR)

( * ) Notice: Subject to any disclaimer, the term of this patent is extended or adjusted under 35 U.S.C. 154(b) by 169 days.

(21) Appl. No.: 13/086,141

(22) Filed: Apr. 13, 2011

(65) Prior Publication Data
US 2011/0290197 A1 Dec. 1, 2011

(30) Foreign Application Priority Data
May 26, 2010 (KR) .................. 10-2010-0049215

(51) Int. Cl.
- A01K 15/02 (2006.01)
- A01K 29/00 (2006.01)
- A01K 11/00 (2006.01)

(52) U.S. Cl.
CPC .................... A01K 15/026 (2013.01)
USPC .......................................................... 119/710

(58) Field of Classification Search
USPC ................... 119/707, 709, 710, 711
IPC ............................ A01K 15/02,29/00
See application file for complete search history.

(56) References Cited

U.S. PATENT DOCUMENTS

| | | | |
|---|---|---|---|
| 3,071,476 A * | 1/1963 | Werft et al. ................ | 604/890.1 |
| 4,802,444 A | 2/1989 | Markham et al. | |
| 4,891,218 A * | 1/1990 | Sherman ......................... | 424/84 |
| 6,148,771 A | 11/2000 | Costello | |
| 6,178,922 B1 * | 1/2001 | Denesuk et al. ............... | 119/710 |
| 6,202,598 B1 * | 3/2001 | Willinger ....................... | 119/709 |
| 6,546,896 B1 * | 4/2003 | Markham ....................... | 119/709 |
| 6,672,252 B2 * | 1/2004 | Levin et al. .................... | 119/709 |
| 7,506,614 B1 * | 3/2009 | Tsengas ......................... | 119/710 |
| 8,124,156 B2 * | 2/2012 | Axelrod et al. ............... | 426/512 |
| 2003/0168020 A1 * | 9/2003 | Levin et al. .................... | 119/709 |
| 2004/0099224 A1 * | 5/2004 | Russell-Maynard et al. . | 119/709 |
| 2004/0137118 A1 | 7/2004 | Axelrod | |
| 2004/0244719 A1 * | 12/2004 | Jager ............................. | 119/709 |
| 2008/0314333 A1 * | 12/2008 | Hurwitz ........................ | 119/709 |
| 2009/0151649 A1 * | 6/2009 | Vardy et al. ................... | 119/710 |
| 2011/0265732 A1 * | 11/2011 | Lai ................................. | 119/710 |

FOREIGN PATENT DOCUMENTS

| | | |
|---|---|---|
| KR | 20-0334717 | 11/2003 |
| KR | 10-2009-0003238 | 1/2009 |

* cited by examiner

*Primary Examiner* — Shadi Baniani
(74) *Attorney, Agent, or Firm* — Sherr & Jiang, PLLC

(57) ABSTRACT

Provided is a pet dental chew. The pet dental chew includes a body made of material ingestible for a pet and having a predetermined size insertable to a pet's mouth, a plurality of upper core units formed on one side of the body, a plurality of lower core units formed on the other side of the body and arranged in a pattern oblique to the plurality of the upper core units, and a plurality of air holes formed in the body between the one side and the other side.

9 Claims, 3 Drawing Sheets

PET DENTAL CHEW

CROSS-REFERENCE TO RELATED APPLICATION

The present application claims priority under 35 U.S.C. 119 to Korean Patent Application No. 10-2010-0049215 (filed on May 26, 2010), which is hereby incorporated by reference in its entirety.

BACKGROUND

The mouths of pets, especially dogs and cats, are more than an entrance into their digestive systems, and they are also the avenues of communication with the outside world.

Pets, like cats and dogs, investigate their surroundings with their mouths using their linguae and also emit excessive heat through the linguae. As a result, pet are susceptible to various clinical diseases impacting their mouth and teeth.

Compounding the problem is the pets' diet of easily chewed foods. Chewing or mastication is the primary way of removing plaques from the teeth. Pets provided with easily chewable foods, such as cats and small dogs, are liable to suffer from dental disease as they tend to chew less and thus incur a higher incidence of dental calculus than do larger dogs.

Dental calculus is caused by the accumulation of minerals on deposits of food debris, desquamated epithelial cells and various types of microorganisms on the teeth. Dental calculus consists of a relatively soft portion on the teeth at the supragingiva and a hard portion at the subgingiva, that is, the tooth root below the gingival margin.

Calcium phosphate accounts for most of the inorganic elements found in mature dental calculus. Dental calculus and plaque are partially responsible for gingivitis, alveolar pyorrhea, and halitosis. Dental calculus and plaque accumulation cause the gingiva to become irritated and inflamed, ultimately destroying the gums to the extent that requires dental surgery. Among the best ways to prevent the buildup of calculus and to maintain healthy teeth and gums are daily tooth brushing after each meal and regular gingival massages. Also, twice annual veterinary oral cleanings are recommended for the removal of dental calculus.

However, these preventive measures are difficult to undertake because animals are averse to tooth brushing. Furthermore, dental visits for scaling are expensive and time-consuming Under U.S. Pat. No. 4,802,444, a pet chew or toy prophylactic of dental diseases is disclosed. The pet toy of U.S. Pat. No. 4,802,444 is designed not only to provide masticatory exercise for dogs or other carnivores, but also to perform dental prophylaxis as the animals chew the toy.

In detail, the pet toy includes an elastomeric body with at least one groove which is configured to scrape plaque and other debris from the teeth and gingiva of a pet, which is repeatedly inserted into the groove and at least partially withdrawn from the groove as the pet chews the toy.

Also, the elastomeric body of the pet toy is provided at the center thereof with a hollow core which enhances tooth and gingival scraping to remove plaque when a dog chews the toy by providing the body with the capability of resiliently bowing into the hollow core.

However, the pet chew or toy prophylatic of dental diseases in accordance with U.S. Pat. No. 4,802,444 suffers from the following disadvantages:

The elastomeric body does not provide incentive for the animal to chew it. With the lack of attractiveness, the pet toy, although placed around a pet, is not utilized as a chew, but simply as a toy that the pet plays with by its feet or transfers to its mouth. Pets do not chew the toy with sufficient strength to remove the calculus formed on the teeth thereof. In some cases pets are even indifferent to the elastomeric toy.

To avoid these sorts of problems with elastomeric toys, the body of the toy was coated with a flavorant to conceal rubber odor. Embedding a palatable agent in the elastomeric body was also tried.

Coating with a flavorant does not overcome the excellent olfactory sense of animals so that they regard it as non-edible. The palatable agent applied to the groove of the elastomeric body is just lapped with the tongue, but not chewed for the most part.

As for the palatable agent embedded in the elastomeric body, pets may try to chew the elastomeric body to eat the palatable agent at first, but they soon cease the masticatory exercise.

Consequently, pets regard the elastomeric body not as a food, but rather as a plaything, so that it is difficult to expect that the elastomeric body could guarantee active masticatory exercise to pets.

Whenever a pet eats, plaque may form and develop on its teeth and thus needs to be removed regularly. Nonetheless, the elastomeric body contributes to masticatory exercise only occasionally.

Even if the coated or applied flavorants succeed in inducing pets to play with and chew the elastomeric body, it is readily contaminated with saliva and impurities as a matter of course and thus may act as a habitat for harmful bacteria, resulting in aggregating rather than preventing dental diseases.

To solve this problem, the procedure of sterilizing, washing and drying must be conducted many times a day just after use, which is inconvenient for the pet's owner.

Composed of an elastromeric body of somewhat hardness, the pet toy of U.S. Pat. No. 4,802,444 may be expected to show little cleaning effect, but has difficulty removing the plaque attached firmly to the teeth. In consequence, the existing pet toy is insufficient to meet the function and expectancy for being prophylactic of dental diseases.

An alternative pet chew or toy for preventing dental diseases in pets is found in Korean Patent Laid-Open Publication No. 2009-0003238. The pet chew article of this patent reference comprises a toy with a consumable, chewable body having at least one protrusion.

According to this patent reference, the consumable body, made of modified wheat gluten alone or in combination with other ingredients, induces pets to perform chewing activity, thus preventing dental diseases.

However, the conventional pet chew article, when chewed by pets, allows the teeth to be scrubbed only at a very partial portion (mainly end portion), but cannot function to remove plaque or calculus firmly accumulated on the gums.

To remove plaque, the consumable body should not only possess sufficient mechanical hardness, but also must be able to scrub the teeth to sufficient depth, that is, the gingival region. In the Korean Patent Laid-Open publication emphasis is placed on the fact that the pet chew is made of tough and softened materials which are chewable for an extended time and that any pieces of the article that are ingested by a consuming animal are small enough that they will not become lodged within the animal's digestive tract. Thus, its dental cleaning effect is significantly reduced.

According to the Koran Patent Laid-Open Publication, the consumable body is made with desirable hardness and does not get "gummy" or "slimy" when wet. It provides the effects of long chewing, mechanically cleaning teeth at the end portion, and preventing dental diseases with a calculus preventer. However, it is not useful for removing the plaque already firmly attached to the teeth flushed with the gingiva.

SUMMARY

Embodiments related to a pet dental chew that induces active masticatory exercise and effectively removes calculus and plaques from teeth and gum.

Embodiments relate to a pet dental chew that guarantees gingival massages and induces the removal of calculus and plaques through mechanical friction with the teeth.

Embodiments relate to a pet dental chew that overcomes the problems of the related art, including poor induction of masticatory exercise, potential for a non-hygienic state, and inefficient plaque removal.

According to embodiments, a pet dental chew includes a body made of material ingestible for a pet and having a predetermined size insertable to a pet's mouth, a plurality of upper core units formed on one side of the body, a plurality of lower core units formed on the other side of the body and arranged in a pattern oblique to the plurality of the upper core units, and a plurality of air holes formed in the body between the one side and the other side.

The body may be made of a composition including starch in an amount of 30~70 wt %, sugar in an amount of 5~30 wt % and water in a balance to 100 wt %, and has a surface hardness of 25~50 A.

The composition may further include an additive selected from the group consisting of a moisturizing agent, a palatability enhancer, a calculus remover, a nutrient, a binder, an antibacterial agent and a combination thereof.

Each one of the upper core units and the lower core units may have a dual structure including a groove and a protrusion hill.

Each one of the upper core units and the lower core units may be extended in a first direction parallel to arrangement of teeth of a pet and the air holes penetrate the body in a second direction perpendicular to the first direction.

According to another embodiment, a pet dental chew includes a body having predetermined shape and size insertable into a pet's mouth, a plurality of upper core units formed on an upper part of the body in a first direction and forming a corrugated structure capable of removing plague attached to upper teeth and gingival of a pet, a plurality of lower core units formed on a lower part of the body in the first direction and forming a corrugated structure capable of removing plague attached to lower teeth and gingival of a pet, and a plurality of air holes formed in the body between the upper part and the lower part and penetrating the body in a second direction that is perpendicular to the first direction.

The body may be made of predetermined material ingestible for pets, and the predetermined material may be a composition including starch in an amount of 30~70 wt %, sugar in an amount of 5~30 wt % and water in a balance to 100 wt %, and has a surface hardness of 25~50 A.

The composition may further include an additive selected from the group consisting of a moisturizing agent, a palatability enhancer, a calculus remover, a nutrient, a binder, an antibacterial agent and a combination thereof.

The plurality of upper core units may be arranged in a pattern oblique to the plurality of the lower core units in coincident with an oral structure of a pet in order to facilitate mastication of the pet.

Each one of the upper core units and the lower core units may be extended in the second direction to allow two or more teeth to be inserted into each one of the upper core units and the lower core units.

The second direction may be a direction parallel to an arrangement of teeth of a pet.

Each one of the upper core units and the lower core units may include a groove and a protrusion hill. The groove of the upper core unit may be on a same vertical line with the protrusion hill of the lower core unit, and the protrusion hill of the upper core unit may be on a same vertical line with the groove of the lower core unit.

The groove may be comparatively wider at a top and comparatively narrower at a bottom thereof, and the protrusion hill has a corrugated wall.

The plurality of air holes may be formed in at least one of circular shape, elliptical shape, and combination thereof.

Being composed of an ingestible body, the pet dental chew of the present invention shows palatability sufficient to induce the active mastication of pets. Thus, it has a high possibility for plaque removal, compared to the pet articles disclosed in U.S. Pat. No. 4,802,444 and Korean Patent Laid-Open Publication No. 2009-0003238.

In addition, the air holes formed within the body function to dry the inner portion of the body so that the pet dental chew, show at both inner and outer regions thereof, has a hardness great enough to remove plaque. Thus, the pet dental chew of the present invention has greater mechanical friction force to use against oral plaque remainders, in comparison with that of Korean Patent Laid-Open Publication No. 2009-0003238. Also, the air holes allow the removal of plaque irrespective of the orientation of the body.

Furthermore, the dual structure of the upper and lower core unit not only increases the efficiency of plaque removal, but also guarantees excellent flushing effects on the surface of the teeth.

Moreover, the upper and lower core units and the air holes are formed over the entire body. In this structure, the pet dental chew is destroyed along the air holes upon mastication, so that the pet can ingest it little by little without leaving debris. Also, the pet dental chew allows continuous mastication over a long period of time, thus maximizing the effect of plaque removal.

DRAWINGS

DESCRIPTION

Figure 1:
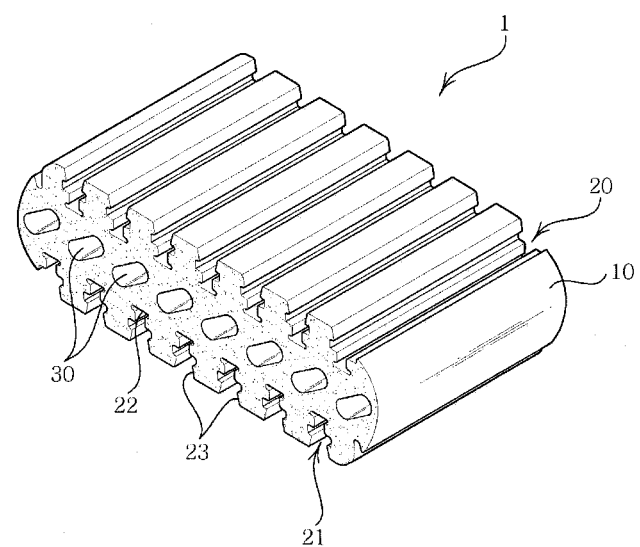
FIG. 1 is a perspective view that illustrates a pet dental chew according to an embodiment.

Hereinafter, embodiments of the present invention will be described in detail while referring to the accompanying drawings. Throughout the drawings, the same reference numerals are used to refer to the same or similar elements. Moreover, descriptions of known techniques, even if they are pertinent to the present invention, are regarded as unnecessary and may be omitted when they would make the characteristics of the invention and the description unclear.

As used herein, a term "pet" means an animal bred as a companion with affection and is intended to include all pets which have sharp teeth, like dogs and cats.

FIG. 1 illustrates a pet dental chew 1 according to embodiments.

Referring to FIG. 1, the pet dental chew 1 includes a body 10, a plurality of upper core units 20 formed on an upper part of the body 10, a plurality of lower core units 21 formed on a lower part of the body 10, and a plurality of air holes 30 formed in the body 10 between the upper part and the lower part. The body 10 induces pets to perform an active masticatory exercise. The upper and lower core units 20 and 21 form a corrugated structure capable of removing plaque attached firmly to the teeth and gingiva during the masticatory exercise. The plurality of air holes 30 functions both to allow the body 10 to be cut to predetermined sizes upon masticatory exercise and to guarantee sufficient hardness to remove the plaque.

According to embodiments, the body 10 is ingestible for pets. The term "ingestible" means to be provided with consumability and palatability. Herein, consumability accounts for its attractiveness to pets while palatability means its quality of inducing pets to chew it.

It is understood that the prevention of dental diseases in pets is achieved by masticatory exercise. In order to induce pets to do masticatory exercise, hence, the pet dental of the present invention chew should be recognized as a food. For this, the pet dental chew should be ingestible and easy for pets to hold in their mouths and masticate.

Thus, the body 10 has a size and a shape that are easily insertable into the mouth. The term "insertable into the mouth" means oral insertion of the body 10 in part as well as in entirety. In consideration of this, the body 10 is determined with regard to width, thickness and length.

In addition, pets have teeth of various sizes according to kinds thereof. In any case, the upper and lower core units 20 and 21 and the air holes 30 must be narrow enough to provide a sufficient frictional force for the teeth which enter and exit.

As for foods which are in the form of a stick with too large a size to pass once through the throat, pets receive them with their foreteeth and masticate with their molar teeth. Most of them chew such large foods in the direction perpendicular to the arrangement of the molar teeth.

In this context, typical pet dental chews, whether in the form of sticks or other shapes, are structured to have protrusions and grooves positioned in the direction perpendicular to the arrangement of the teeth when they are chewed by pets. Accordingly, pet dental chews are ineffective in the treatment of the calculus or plaque formed on the outer surfaces of teeth.

In full consideration of the background, the pet dental chew according to the embodiments includes a body 10 formed in a shape of a rectangular block and upper and lower core units 20 and 21 each extended in one direction to allow two or more teeth to be inserted therein. For example, the one direction may be a direction parallel to the arrangement of the teeth. Upon pet's mastication that a greater number of teeth are inserted into each one of the upper and lower core units 20 and 21, with concomitant mechanical friction around the gums.

As stated above, the pet dental chew according to embodiments must be ingestible. With this requirement in mind, the ingestible body 10 is prepared from a composition including various commercially available ingredients, mainly starch, sugar and water.

In embodiments, the body 10 is molded from the composition comprising starch in an amount of from 30 to 70% by weight to secure a desired physical and mechanical friction force. In the composition, sugar may be used in an amount of from 5 to 30% by weight, not only to provide a suitable organizational power, binding stability, and palatability, but also to increase intragastric digestibility. Water is used to form a balance of 100% by weight.

Examples of the starch useful in the present invention include corn starch, potato starch, sweet potato starch, tapioca starch, wheat starch, gluten, rice starch, oat starch, soybean starch, barley starch or a combination thereof.

When the starch is used in an amount less than 30% by weight, the body is too weak in binding stability to guarantee a desired mechanical friction. On the other hand, more than 70% by weight of the starch brings about too high a binding strength, injuring the teeth and/or the gingiva rather than improving mechanical friction.

In accordance with the present invention, the sugar is selected from the group consisting of isomalto-oligosaccharide, fracto-oligosaccharide, galacto-oligosaccharide, soybean oligosaccharide, maltitol, sorbitol, mannitol, lactitol, erythritol, malto-oligosaccharide and a combination thereof. Less than 5% by weight of the sugar would decrease both organizational power and binding stability. On the other hand, the composition comprises more than 30% by weight of sugar, and it becomes so high in water content as to decrease the hardness of the body.

After the components are well mixed with water, the resulting composition is molded into desired forms by extrusion and then dried by conducting such many cycles of heating and cooling between 30 and 90° C. as to obtain a desirable hardness.

The molded body in which the upper and lower parts 20 and 21 are formed preferably ranges in hardness from 25 to 50 A in terms of plaque removal and cleaning effect.

When the hardness of the molded body is less than 25 A, its mechanical friction force is too weak to effectively remove plaque and calculus. On the other hand, a hardness exceeding 50 A has an adverse influence on the teeth and the stomach and may injure the teeth and gingival rather than guaranteeing mechanical friction.

Also, the composition may further comprise a moisturizing agent selected from the group consisting of palm oil, olive oil, soybean oil, corn oil, canola oil, rice bran oil, grape seed oil, sunflower oil, hydrogenated palm kernel oil, propylene glycol, glycerin, aloe vera, sorbitol, glucose or a combination thereof to bring about an improvement in resiliency, flexibility, organizational power, and water retention power as well as intragastric digestibility.

The composition may further comprise an additive selected from the group consisting of a palatability enhancer, a calculus remover, a nutrient, a binder, an antibacterial agent, and a combination thereof within an amount range accepted in the art.

Examples of the palatability enhancer useful in the present invention include beef, pork, mutton, chicken, yolk, egg, albumen, and MDCM (Mechanically Deboned Chicken Meat), but are not limited thereto.

To assist in calculus removal, prevention of calculus deposition, and mitigation of inflammatory diseases, zinc salt or phosphate salt may be used. Examples of zinc salt include zinc nitrate, zinc sulfate, zinc citrate, zinc chloride, zinc acetate and zinc gluconate. Polyphosphate is useful and may be selected from among pyrophosphate, tripolyphosphate, hexameta phosphate and a combination thereof.

For the purpose of nutritional provision to teeth and mucous membranes of the oral cavity, the composition may further comprise a nutrient including vitamins such as vitamin B and/or calcium gluconate. For use in the composition, an anti-inflammatory and/or antibacterial agent is selected from the group consisting of grapefruit seed extract, acetic acid, dibenzoyl thiamine, lactic acid, malic acid, adipic acid, phytic acid, chito-oligosaccharid, chitosan, green tea extract, or a combination thereof.

The binder may be selected from the group consisting of gelatin, xanthan gum, sodium carboxymethyl cellulose, carrageenan, agar, alginic acid, methyl cellulose, or a combination thereof. Also, the composition may further comprise an edible dye or edible flavor for better quality and taste.

As stated above, the upper and lower core units 20 and 21 formed in the body 10 are structured to remove plaques attached on the teeth and the gingival.

Figure 2:
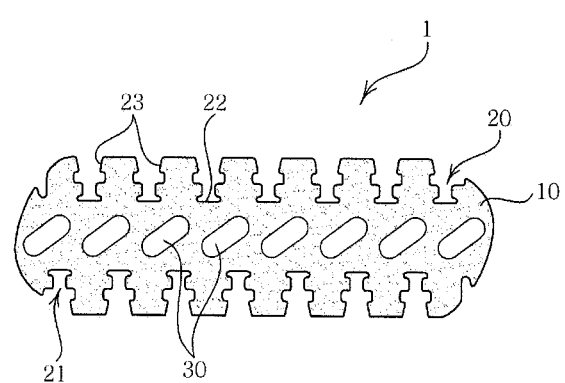
FIG. 2 is a front view that illustrates the pet dental chew of FIG. 1.
Figure 3:
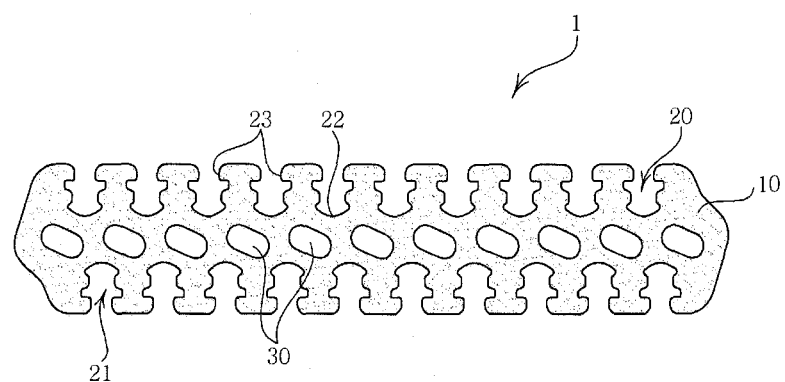
FIG. 3 is a front view that illustrates a pet dental chew according to another embodiment.

FIG. 2 is a front view that illustrates the pet dental chew of FIG. 1. FIG. 3 is a front view of a pet dental chew according to another embodiment.

As shown in FIGS. 2 and 3, the upper core units 21 present in the upper portion of the body 10. Each upper core unit 21 includes a groove 22 and a protrusion hill 23. Likewise, the lower core units 21 present in the lower portion of the body and each lower core unit 21 has the same structure as in the upper core unit 20.

When a pet masticates the pet dental chew according to the embodiments, the upper core units 20 account for the removal of plaque formed on the upper teeth and gingiva through mechanical friction between the upper teeth and gingiva and the grooves 22 and hills 23.

In greater detail, the teeth of pets, for the most part, have pointed-ends. Upon mastication with the pet dental chew of the present invention, the teeth go in and out of the grooves 22, generating mechanical friction between the end portions of the teeth and the grooves 22 and between the other portions of the teeth and the protrusion hills 23. Such mechanical friction removes the plaque formed on the teeth and gingiva.

On the other hand, the lower core units 21, located on the opposite side to the upper core unit 20, are responsible for the removal of plaque sticking to the lower teeth and gingiva. Preferably, the lower core units 21 are arranged in a pattern oblique to the upper core units 20.

Being in high accord with the oral structures of pets, the arrangement of the core units in the oblique pattern facilitates the removal of plaque and makes the body 10 non-fragile during masticatory exercise.

Almost all animals, including pets, exhibit maxillary dentoalveolar protrusion to avoid dental injury upon occlusion between the upper and the lower teeth. Accordingly, the oblique arrangement of the upper core units 20 and the lower core units 21 is coincident with the oral structure to facilitate the mastication of pets.

In addition, when the upper core units 20 and the lower core units 21 are arranged in an oblique pattern to each other, as seen in FIGS. 2 and 3, the upper or lower grooves 22 are on the same vertical lines with the lower or upper hills 23, respectively. The body in this oblique arrangement pattern of the upper and lower core units 20 and 21 has a higher hardness and thus is less liable to be broken than in an arrangement pattern in which the upper grooves 22 are on the same vertical line with the lower grooves 22. Also, the oblique pattern improves mechanical friction against the teeth without change in material, resulting in an increase in the efficiency of plaque removal.

With the oblique arrangement pattern of the upper and lower core units 20 and 21, even only mastication makes it possible to remove the plaque attached firmly to the teeth and gingiva through mechanical friction, thus preventing oral diseases.

Meanwhile, the upper core units 20 and the lower core units 21 may have a dual structure so that, in each of the repeat units, a groove varies in width along its depth and a hill is corrugated along its wall.

In detail, the groove 22 in the upper and lower core units 20 and 21 becomes narrowed as it deepens. Thus, the groove is wide at the top and narrow at the bottom, which coincides with the general dental shape while the hill has a corrugated wall. This dual structure increases the frictional area between teeth and the cores, thus improving the efficiency of plaque removal and a flushing effect on tooth surfaces.

Formed between the upper core units 20 and the lower core units 21 within the body 10, the air holes 30 function to dry the interior of the body 10 to the extent of allowing the body to perform a plaque removal function. In addition, another function of the air holes 30 is to induce non-oriented plaque removal during mastication.

As previously stated, the pet dental chew according to embodiments is prepared by molding an ingestible composition into the body 10 by extrusion and drying it for a predetermined period of time to secure a hardness large enough to remove plaques. The relationship between plaque removal and hardness is as mentioned above.

During the drying process, the body 10 is readily hardened at the outer portion (surface) thereof due to the contact with air, but remains softened at the inner portion because it is not in contact with air.

If the inner portion remains softened, the body 10 does not work well to remove plaque because it will be easily broken during the mastication of pets. As well, the body 10 will be fragmented during treatment and masticatory exercise, resulting in a mess in the surrounding, as is readily understood from a biscuit which is hard at the surface and soft in the inner.

Thus, the air holes 30 allow air to pass through to dry the inner portion of the body 10 to guarantee inner hardness sufficient to remove plaque.

Also, the term "non-orientated plaque removal" means the ability to remove plaque irrespective of the direction in which pets chew the body 10. For this, the air holes 30 penetrate the body in a direction perpendicular to the arrangement direction of the upper core unit 20 and the lower core unit 21.

Pets do not always masticate the pet dental chew according to embodiments in the direction coincident with the upper and lower core units 20 and 21. Thus, the air holes 30 are also provided for coping with the mastication in the perpendicular direction.

Figure 4:
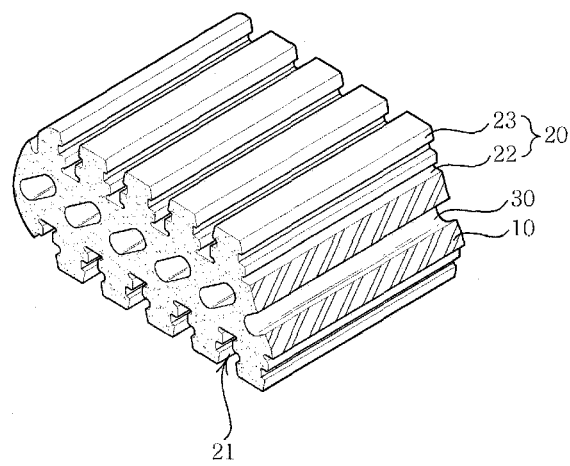
FIG. 4 is a perspective view that depicts a part separated from a pet dental chew after a pet performs masticatory exercise with the pet dental chew for awhile.

FIG. 4 is a perspective view that depicts a part separated from a pet dental chew after a pet performs masticatory exercise with the pet dental chew for awhile.

The air holes 30 allow the body 10 to be cut without compulsive force as it is destroyed during the mastication of a pet.

In greater detail, the body 10 is molded to have hardness sufficient for removing plaque, which may damage the oral structures of the pets that use it. The air holes 30 are provided between the upper core units 20 and the lower core units 21 to prevent the teeth from being damaged when a pet destroys the body during mastication, as shown in FIG. 4.

As shown in FIG. 4, the air holes 30 are elliptical so that they facilitate the insertion of teeth thereinto as well as the drying of the inner portion of the body. Alternatively, they may be formed in the form of circles or in mixtures of circles and ellipses.

Figure 5:
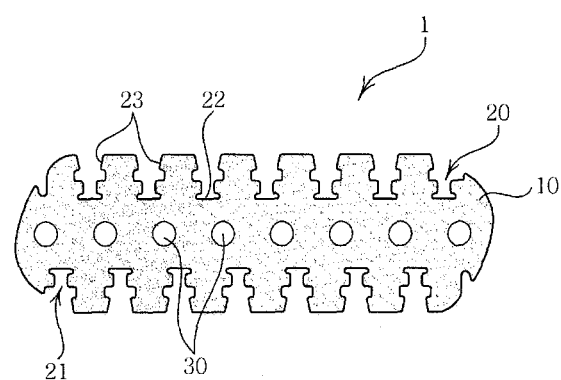
FIG. 5 is a front view of a pet dental chew according to further another embodiment.

For example, FIG. 5 illustrates a pet dental chew including air holes 30 each formed in a form of circle.

As described hitherto, the pet dental chew according to embodiments includes the body 10 extending in a lengthwise direction, in which the upper core units 20 and lower core units 21, and the air holes 30 are arranged in the lengthwise direction. Thus, pets can ingest the upper and lower core units 20 and 21 of the pet dental chew sequentially in the same direction during a continuous masticatory exercise. In the course of the continuous masticatory exercise the plaque attached to the teeth and gingiva can be removed.

As such, the pet dental chew according to embodiments is expected to induce pets to do a masticatory exercise and thus to remove plaque.

Additional objects, advantages, and novel features of the present invention will become apparent upon examination of the following examples. Additionally, each of the various embodiments of the present invention as delineated hereinabove and as claimed in the claims section below are supported by the following examples.

Example 1

To a mixture of 40 wt % of tapioca and rice starch, 5 wt % of gelatin, 3 wt % of glycerin, 8 wt % of maltitol, 5 wt % of fructo-oligosaccharide and 1.5 wt % of soybean oil were added 5 wt % of chicken meal and 0.3 wt % of a concentrated chicken flavor, followed by balancing with purified water to a total of 100 wt %. The resulting formulation was cooking and extrusion molded into the body 10 of FIG. 1, with a dimension of 90×25×25 mm, in which each of the upper 20 and lower core 21 were 4.3 mm wide and 7.7 mm deep and each of the air holes was elliptical with a size of 2.5×5.6 mm. The body was found to have a hardness of 40 A as measured by a durometer.

Comparative Example 1

The same procedure as in Example 1 was repeated, with the exception that the body was molded into a flat form free of the upper and lower core units 20 and 21 and the air holes 30.

Comparative Example 2

The same procedure as in Example 1 was repeated, with the exception that the chicken meal was not used.

Comparative Example 3

The same procedure as in Example 1 was repeated, with the exception that the molded body was in the form of a H beam, with a groove 12 mm wide and 7.7 mm deep.

Control 1

A repeat units, each consisting of a protrusion and groove 5 mm in size, were formed over the entire surface of an elastomer structure, with a hole 12 mm in diameter tunneling through the center thereof. The elastomer structure was entirely coated with a chicken flavorant.

Control 2

A chicken soup which was too thick to flow was applied to the external grooves of the body of Comparative Example 2.

Control 3

The 12-mm central hole of the body of Comparative Example 2 was densely filled with chicken jerky.

<Selection of Test Animal>

Beagle dogs 60 months old were examined by inspection and exploration for oral diseases and assay. Of them, nine dogs were selected because of high accumulation of dental plaques.

<Test Condition>

In a space to which light and fresh air was supplied, nine test animals were allowed to exercise and fed with a predetermined amount of artificial foods every morning and evening for 4 weeks before testing. During tests, the same conditions were provided.

The test animals were divided into three groups of three.

<Test and Evaluation Method>

1) Palatability evaluation, 2) the disclosing solution or tablet method of the caries active test, and 3) oral acid-producing test (modified snyder test by use of cariostat) were performed as follows:

1. Palatability Test

The molded bodies of Comparative Examples 1 and 3 and Controls 1 to 3 were supplied to all of the nine Beagle dogs that were then observed with regard to whether they actively masticated the bodies. In consideration of the familiarity upon repeat learning, they were tested six times over three days.

2. Disclosing Solution or Tablet

The bodies of Example 1, Comparative Example 3 and Control 3 were respectively supplied to Groups 1 to 3, at a dose of one body per animal every morning and afternoon for eight weeks. The teeth were colored with a disclosing agent once every two weeks for two months (four times) to examine the presence of a bio film of plaques. The results were compared and assayed according to the dental plaque index method.

3. Modified Snyder Test by Use of Cariostat

This test is a colorimetric test for examining the quantity and activity of oral acid-producing bacteria, based on the fact that bacteria in dental plaque or saliva produce acid. For this, bimaxillary posterior teeth were scrubbed on the outer surface with cotton once every two weeks for two months (four times). The cotton was placed in a medium which was incubated at 37° C. for 48 hrs to examine the color change of the medium.

Results of the above tests are given as mean values of measurements in Tables 1 to 3, below.

TABLE 1

| | Palatability Test | | | | |
|---|---|---|---|---|---|
| | C. Ex. 1 | C. Ex. 2 | Control 1 | Control 2 | Control 3 |
| [1])Palatability | 8~10 | Shifted from 2 to 6 | Near 1 | Shifted from 4 to 0 | Shifted from 4 to 2 |

※ For the palatability test, five pet experts (veterinarian, pet handlers, researchers) were selected as examiners who organoleptically evaluated the masticatory activity of test pets according to the criteria of Table 2 when they were fed with the bodies. The results are expressed as mean values of the measurements of the examiners.

TABLE 2

| Criteria for Palatability Test | |
|---|---|
| State | Score |
| Immediately and continuously | 10 |
| Not immediately, but continuously | 8 |
| Not immediately, but gradually favorable | 6 |
| Contemporarily favorable | 4 |
| Interested, but not favorably | 2 |
| No responses | 0 |

TABLE 3

|  | Ex. 1 | C. Ex. 1 | C. Ex. 3 | Control 3 |
| --- | --- | --- | --- | --- |
| Anti-plaque formation 1) | Good | Moderate | Moderate | Poor |
| Acid-producing bacteria 2) | No or slight activity | Moderate or slight activity | Moderate or slight activity | High or moderate activity |

1) Criteria for dental plaque index
Good 0~1, Moderate 1~2, Poor 2~3, Very poor 3~5
2) Criteria for formation of acid-producing bacteria are given in Table 4, below.

TABLE 4

| Color | Activity | Symbol |
| --- | --- | --- |
| Blue | None | − |
| Green | Slight activity | + |
| Yellow green | Moderate | ++ |
| Yellow | High | +++ |

As is apparent from data of the palatability test, palatability increased with increasing of flesh content, which was, in our opinion, attributed to the fact that the Beagle dogs were excellent in olfactory sense and clever enough to identify the presence and amount of palatable materials. A flavorant was observed to show a limitation in increasing palatability.

Particularly, Control 3, based on an elastomer structure, although coated with a flavorant or had a chicken soup or jerky inserted into it in order to mask the rubber odor and increase palatability was not regarded as a food, but as a toy. The pets occasionally played with it, but rarely chewed it.

Results from 2) the disclosing solution or tablet method of the caries active test, and 3) the oral acid-producing test (modified snyder test by use of cariostat) are illustrated as follows:

The body of Example 1, a little smaller in size than the teeth of Beagle dogs, showed excellent plaque removal performance because its upper core unit 20 and lower core unit 21 and air holes 30 guaranteed a high frictional force to effectively remove plaque during active mastication. In contrast, the flat bodies of Comparative Example 1 and H-beam type body of Comparative Example 3 were observed to partially remove plaque, which was, however, attributed to the antibacterial agent rather than frictional forces during mastication.

Meanwhile, Control 3 was too low in palatability to induce the pets to do a masticatory exercise. The result of Control 3 was obtained by artificially allowing the Beagle dogs to bite the body and pulling and pushing it with the dog for fun.

Consequently, as described hitherto, the pet dental chew of the present invention is extrusion molded from a composition comprising the base material in combination with chicken meal and a concentrated chicken flavorant, and has a structure in which the upper core unit 20 and the lower core unit 21 and the air holes 30 are formed and arranged to cause high frictional forces upon mastication, and a hardness of from 25 to 50 A, and exhibits excellent plaque removal and cleaning effect.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A pet dental chew comprising a body made of material ingestible and digestible as food for a pet and having a predetermined size insertable to a pet's mouth, the body comprising:
   a plurality of upper core units made of material ingestible and digestible as food for the pet and formed on an upper side of the body;
   a plurality of lower core units made of material ingestible and digestible as food for the pet and formed on a lower side of the body; and
   a plurality of air holes formed in the body between the upper side and the lower side, wherein each air hole penetrates the body,
   wherein the entire body including the plurality of upper core units and the plurality of lower core units is made of a composition comprising starch in an amount of 30~70 wt %, sugar in an amount of 5~30 wt % and water in a balance to 100 wt %,
   wherein the plurality of upper and lower core units and the plurality of air holes are arranged over the entire body in a longitudinal direction of the body,
   wherein each one of the upper core units and the lower core units include a groove and a protrusion hill, and wherein each groove of the upper core units is on a same vertical line with adjacent protrusion hill of the lower core units, and each protrusion hill of the upper core units is on a same vertical line with adjacent groove of the lower core units,
   wherein the protrusion hill includes corrugated side walls each having a recessed portion and a protruded portion with a trapezoidal shape in the longitudinal direction,
   wherein the body having the plurality of upper and lower core units has a surface hardness of 25~50 A.

2. The pet dental chew of claim 1, wherein the composition further comprises an additive selected from the group consisting of a moisturizing agent, a palatability enhancer, a calculus remover, a nutrient, a binder, an antibacterial agent and a combination thereof.

3. The pet dental chew according to claim 1, wherein each one of the upper core units and the lower core units is extended in a first direction parallel to arrangement of teeth of a pet and the air holes penetrate the body in a second direction perpendicular to the first direction.

4. A pet dental chew comprising a body having predetermined shape and size insertable into a pet's mouth, the body comprising:
   a plurality of upper core units formed on an upper part of the body in a first direction and forming a corrugated structure capable of removing plague attached to upper teeth and gingival of a pet;
   a plurality of lower core units formed on a lower part of the body in the first direction and forming a corrugated structure capable of removing plague attached to lower teeth and gingival of the pet; and
   a plurality of air holes formed in the body between the upper part and the lower part and penetrating the body in a second direction that is perpendicular to the first direction,
   wherein the plurality of upper and lower core units and the plurality of air holes are arranged over the entire body in a longitudinal direction of the body,
   wherein each one of the upper core units and the lower core units include a groove and a protrusion hill, and wherein each groove of the upper core units is on a same vertical line with adjacent protrusion hill of the lower core units, and each protrusion hill of the upper core units is on a same vertical line with adjacent groove of the lower core units, wherein the entire body including the plurality of lower core units and the plurality of upper core units is made of material ingestible and digestible as food for pets, the material being made of a composition comprising starch in an amount of 30~70 wt %, sugar in an amount of 5~30 wt % and water in a balance to 100 wt %, wherein the protrusion hill includes corrugated side walls each having a recessed portion and a protruded portion with a trapezoidal shape in the longitudinal direction, wherein the body and the plurality of upper and lower core units have a surface hardness of 25~50 A.

5. The pet dental chew of claim 4, wherein the composition further comprises an additive selected from the group consisting of a moisturizing agent, a palatability enhancer, a calculus remover, a nutrient, a binder, an antibacterial agent and a combination thereof.

6. The pet dental chew of claim 4, wherein each one of the upper core units and the lower core units is extended in the second direction to allow two or more teeth to be inserted.

7. The pet dental chew of claim 6, wherein the second direction is a direction parallel to an arrangement of teeth of a pet.

8. The pet dental chew of claim 4, wherein the groove is comparatively wider at a top and comparatively narrower at a bottom thereof.

9. The pet dental chew of claim 4, wherein the plurality of air holes are formed in at least one of circular shape, elliptical shape, and combination thereof.

* * * * *